US006604178B1

(12) United States Patent
Hall

(10) Patent No.: US 6,604,178 B1
(45) Date of Patent: Aug. 5, 2003

(54) HARD DISK DRIVE EMPLOYING NEURAL NETWORK FOR PERFORMING EXPECTED ACCESS TIME CALCULATIONS

(75) Inventor: David Robison Hall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,665

(22) Filed: Nov. 30, 1999

(51) Int. Cl.[7] .............................................. G06F 12/00
(52) U.S. Cl. ........................ 711/167; 711/111; 711/217; 710/6; 710/39; 710/40; 710/310; 360/901; 369/292
(58) Field of Search .................... 360/901; 369/292; 711/111, 112, 113, 114, 167, 169, 217; 710/6, 39, 40, 41, 43, 45, 54, 310

(56) References Cited

U.S. PATENT DOCUMENTS

| 5,005,089 | A | * | 4/1991 | Thanos et al. ............ 360/77.08 |
| 5,084,791 | A | * | 1/1992 | Thanos et al. ............ 360/77.04 |
| 5,594,597 | A | | 1/1997 | Padden ......................... 360/46 |
| 5,677,609 | A | * | 10/1997 | Khan et al. .................. 318/561 |
| 5,729,718 | A | * | 3/1998 | Au .............................. 711/167 |
| 5,991,825 | A | * | 11/1999 | Ng .................................. 710/6 |
| 6,134,063 | A | * | 10/2000 | Weston-Lewis et al. ...... 360/49 |
| 6,170,042 | B1 | * | 1/2001 | Gaertner et al. ............ 711/158 |
| 6,195,222 | B1 | * | 2/2001 | Heminger et al. ........ 360/78.07 |

OTHER PUBLICATIONS

Wang, Gou–Jen, "Neural Network Approach for Computer Disk Drive Control System," 1992, IEEE International Workshops on Emerging Technologiues and Factory Automation, pp. 271–276.*

Wang, Michelle Y., et al, "Compact Neural Network Detector fro Hard–Disk Drive Usign Zero–Forcing Preprocessing," 1998, IEEE International Symposium on Circuits nad Systems, vol. 3, pp. 9–12.*

C. Alippi and M. Nigri, "Hardware Requirements for Digital VLSI Implementation of Neural Networks," *IEEE International Joint Conference on Neural Networks*, vol. 3, pp. 1873–1878, 1991.

M. Yasunaga et al., "Design, Fabrication and Evaluation of a 5–inch Wafer Scale Neural Network LSI Composed of 576 Digital Neurons," *IEEE International Joint Conference on Neural Networks*, vol. II, pp. 527–535, 1990.

* cited by examiner

*Primary Examiner*—Do Hyun Yoo
*Assistant Examiner*—Christian P. Chace
(74) *Attorney, Agent, or Firm*—Crawford & Maunu, PLLC; Mark A. Hollingsworth

(57) ABSTRACT

A method and apparatus for calculating an expected access time associated with one of a plurality of disk drive commands employs one or more neural networks. A plurality of disk drive commands received from an external source are stored in a memory, typically in a queue. Using a neural network, an expected access time associated with each of the queued commands is determined. Determining the expected access time associated with each of the queued commands involves determining a time for performing a seek and settle operation for each of the queued commands and a latency time associated with each of the queued commands. The command indicated by the neural network as having a minimum expected access time relative to access times associated with other ones of the queued commands is identified for execution. A first neural network may be used to determine an expected access time associated with each read command stored in a read command queue and a second neural network may be used to determine an expected access time associated with each write command stored in a write command queue. A pair of read and write neural networks may be associated with each of a number of read/write transducers employed in a disk drive system. The neural network may be trained at the time of manufacture and on a periodic basis during the service life of the disk drive.

39 Claims, 8 Drawing Sheets

HARD DISK DRIVE EMPLOYING NEURAL NETWORK FOR PERFORMING EXPECTED ACCESS TIME CALCULATIONS

FIELD OF THE INVENTION

The present invention relates generally to data storage systems and, more particularly, to a system and method that employs a neural network to calculate an expected access time associated with each of a number of queued disk drive commands.

BACKGROUND OF THE INVENTION

A typical data storage system includes a magnetic medium for storing data in magnetic form and a transducer used to write and read magnetic data respectively to and from the medium. A typical disk storage device, for example, includes a number of data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation.

Typically, one read/write transducer or head is associated with each disk surface on which data is recorded. The data is generally recorded in equal sized sectors which are placed sequentially in tracks provided on the recordable disk surfaces. The tracks provided on the stack of disks are coaxially aligned such that the grouping of tracks at each position of the heads define a cylinder.

The location of a particular block of data within the stack of data storage disks may be determined by knowledge of three physical parameters. First, the cylinder number which defines the position of the heads must be known. Second, the head number which defines the surface of a particular disk on which the subject data is recorded must be known. Finally, the sector number which defines the specific location on the track at which the subject data is recorded must be known. The physical organization of the data stored in the disk drive is often hidden from the host computer by assigning a Logical Block Address (LBA) to each sector of data, although the LBA is converted to a corresponding Cylinder, Head, and Sector number within the disk drive.

In response to read and write commands received from a host processor, a disk drive system accesses appropriate disk locations to effect the desired read or write operation. In many cases, the disk drive receives commands from the host processor at a rate greater than the rate at which the disk drive is capable of executing the commands. In such cases, several commands are received and stored, typically in a queue, and then selectively executed.

Presently, many advanced hard disk drives employ the well-known Shortest Access Time First (SATF) algorithm to determine which of the queued commands can be initiated (e.g., accessed) first. To determine which command can be accessed first, the SATF algorithm calculates (1) the time to perform the seek and settle operation from the current cylinder to the target cylinder, and (2) the latency between this point and when the starting sector for the command is reached.

Conventional approaches, including those which employ the SATF algorithm, take a heuristic approach to calculating the access time of a given command. These known algorithms generally compare the latency that exists between the current head position and the target position to determine if the seek and settle operations can occur within this time frame. The efficacy of conventional algorithms, including the SATF algorithm, is dependent on the accuracy of the access time estimate. If the estimate is too low, the actuator may settle on the track after the desired sector has already passed rotationally. This will add one full revolution to the access time, thereby degrading performance. If the estimate is too high, then good candidate commands may be passed-over.

Estimating the time to access a command is currently considered a difficult problem in the art. Command access time is generally subject to variation over time due to a number of factors. For example, variations in manufactured drive components and drive mounting variations complicate the effort to accurately calculate the expected access time of a given command. Disk drive vibration and temperature fluctuations also complicate this effort. Conventional approaches to computing a command's expected access time typically ignore these and other factors that influence the accuracy of access time estimates.

Moreover, such conventional approaches are unable to adapt to changes in disk drive system behavior during the operating life of the system, thereby reducing the performance of the drive more drastically as the drive ages. Additionally, currently known access time estimation approaches do not take into account variation between heads or the affect of temperature variance.

There exists a need in the data storage system manufacturing community for an apparatus and method for calculating the expected access time of a disk drive command with greater accuracy than is currently available using conventional techniques. There exists a further need for such an apparatus and method that can adapt over the life of the disk drive, and one that may be realized in hardware as well as software. The present invention is directed to these and other needs.

SUMMARY OF THE INVENTION

The present invention is directed to a method and apparatus for calculating an expected access time associated with one of a plurality of disk drive commands. A plurality of disk drive commands received from an external source are stored in a memory, typically a queue. Using a neural network, an expected access time associated with each of the queued commands is determined. Determining the expected access time associated with each of the queued commands involves determining a time for performing a seek and settle operation for each of the queued commands and a latency time associated with each of the queued commands. The command indicated by the neural network as having a minimum expected access time relative to access times associated with other ones of the queued commands is identified for execution.

The neural network includes a plurality of inputs and outputs. Data representative of a current read/write head position, a target read/write head position, and a latency time defined by the current and target read/write head positions are applied to respective inputs of the neural network. Data representative of disk drive temperature and seek direction (i.e., towards the inner diameter (ID) or outer diameter (OD) of the disk) may also be applied to respective inputs of the neural network. The data inputs to the neural network are preferably scaled.

The outputs of the neural network represent respective percentages corresponding to a likelihood that each queued command's expected access time will fall within a latency time period associated with each queued command, the command's latency time plus one disk revolution time period, and the command's latency time plus a multiple of disk revolution time periods, such as two, three, and four disk revolution time periods. Each output may be multiplied by the time associated with that output, and the output multiplication results may then summed. The sum of the output multiplication results represents the expected access time associated with the subject command.

In accordance with another embodiment, the neural network comprises inputs for inputting data representative of seek length, destination cylinder, and seek direction, respectively. According to this embodiment, the neural network includes a single output. In response to input data applied to the neural network, an output value representing a probability of a particular command's latency falling within a latency time associated with a current disk revolution is provided at the output of the network.

An additional disk revolution time period is added to the command's latency to compute an adjusted latency in response to the command's latency falling beyond the latency time associated with a current disk revolution. The neural network then determines the expected access time associated with the particular command using the adjusted latency.

A disk drive system may employ a plurality of neural networks. In one embodiment, the disk drive system comprises a first neural network and a second neural network. The first neural network is used to determine an expected access time associated with each of a plurality of read commands stored in a read command queue and the second neural network is used to determine an expected access time associated with each of a plurality of write commands stored in a write command queue. Further, a pair of read and write neural networks may be associated with each of a number of read/write transducers employed in a disk drive system.

The neural network may be trained at the time of manufacture and on a periodic basis during the service life of the disk drive. Iterative and batch training approaches may be employed.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
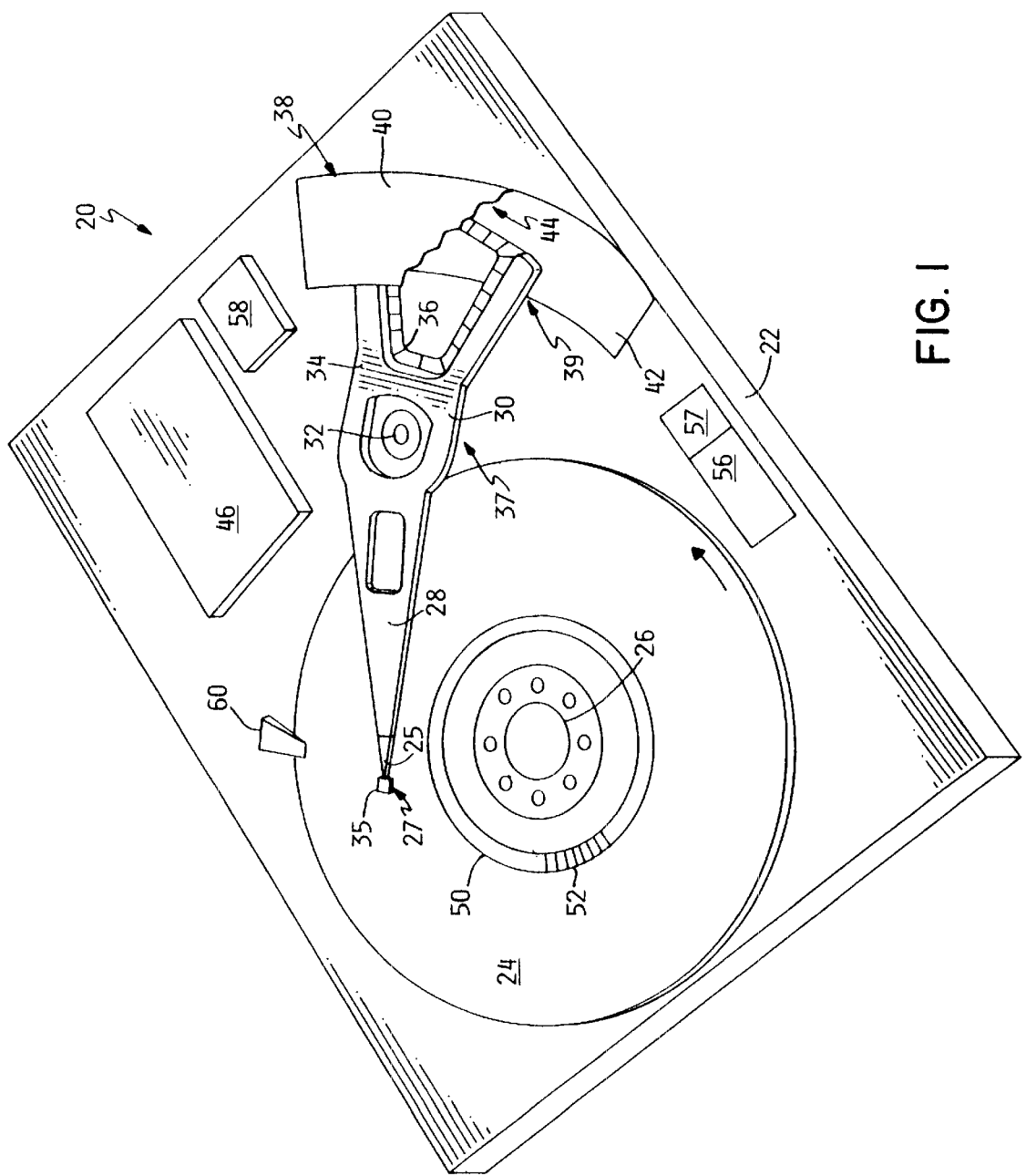
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
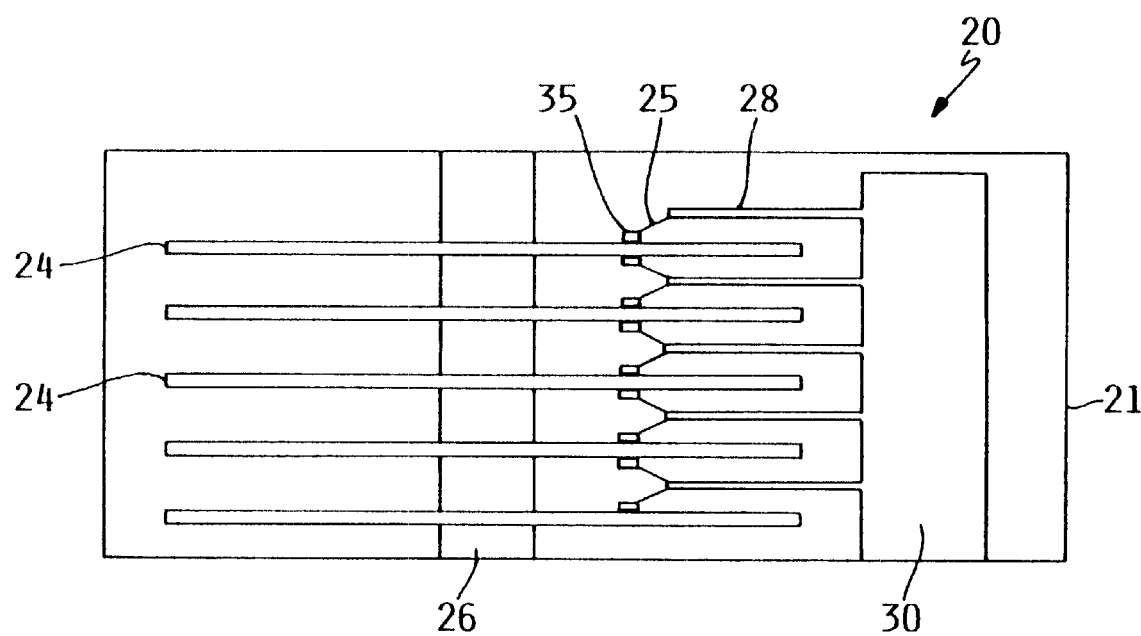
FIG. 2 is a side plan view of a disk drive system comprising a plurality of data storage disks.

Referring to the drawings, and more particularly to FIGS. 1 and 2, there is illustrated a data storage system 20 within which an expected access time calculation methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 40–100 nanometers (nm), is commonly referred to as head-to-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58, also referred to as a disk control processor. The disk control processor 58 typically includes control circuitry and software that coordinate the transfer of data to and from the data storage disks 24. Although the servo processor 56 and disk control processor 58 are depicted as two separate devices in FIG. 1, it is understood that the functionality of the servo processor 56 and disk control processor 58 may be embodied in a single multi-purpose processor, which typically results in a reduced component cost.

A system and method in accordance with the principles of the present invention generally provide for more-precise calculation of the expected access time of a disk drive command in a queued environment in comparison to conventional approaches. A system and method of the present invention is adaptive and accounts for changes in the physical performance of the disk drive over the life of the drive. A system and method of the present invention may be embodied in software, hardware, or a combination of hardware and software. An embodiment of the present invention in hardware may, in particular, provide for appreciable increases in expected access time computations.

Figure 3:
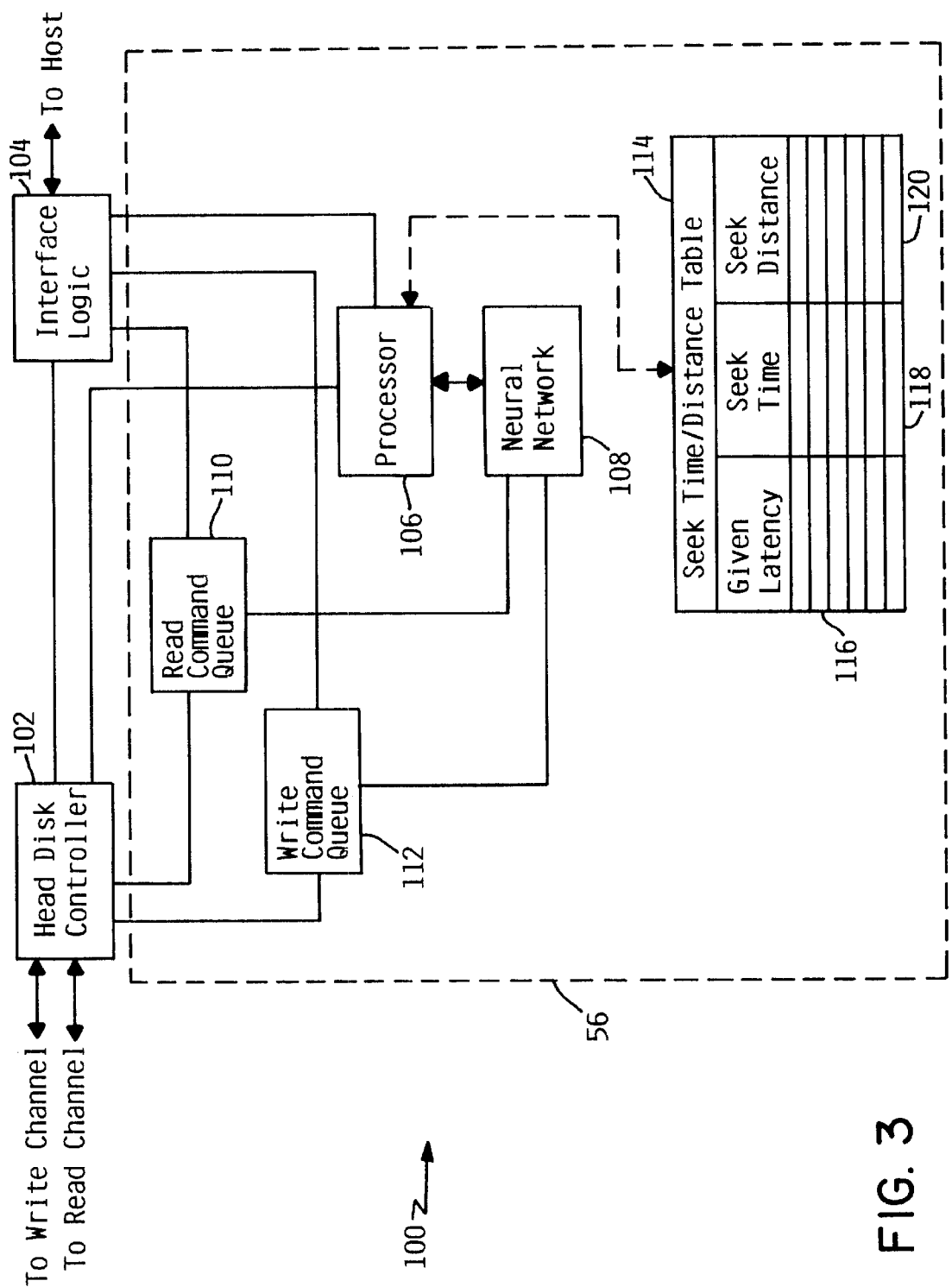
FIG. 3 is a block diagram of a system that employs a neural network to calculate the expected access time of each of a number of queued disk drive commands according to an embodiment of the present invention.

Referring now to FIG. 3, there is illustrated a block diagram of an apparatus 100 for calculating the expected access time of disk drive commands in accordance with an embodiment of the present invention. The apparatus 100 includes a disk control processor 56 which is coupled to a head disk controller 102 and an interface 104. The head disk controller 102 is responsible for timing within apparatus 100 and coordinates the transfer of data between the read and write channels and interface 104. The interface 104 is coupled to a host processor, such as a PC or other computer or network system. Interface 104 provides input/output connectivity with an external system and enforces a given interface standard (e.g., AT, SCSI, SSA) depending on the particular model employed.

The disk control processor 56 includes a processor 106 which is coupled to interface 104 and the head disk controller 102. Processor 106 is also coupled to a read command queue 110 and a write command queue 112, each of which is coupled to the head disk controller 102. It is noted that the read and write command queues 110, 112 may be included within the head disk controller electronics rather than the disk control processor electronics. It is further noted that the read and write command queues 110, 112 may alternatively be embodied as a common queue with appropriate designations used to distinguish between read and write commands. A combined queuing approach, however, will likely require increased processing overhead and time.

Read commands which cannot be immediately executed are stored in the read command queue 110 until selected and executed. Similarly, write commands which cannot be immediately executed are stored in the write command queue 112 until selected and executed. In accordance with the principles of the present invention, processor 106 cooperates with a neural network 108 to calculate the expected access time of each of the queued read and write commands. It is noted that the terms read command and write command will be interchangeably referred to as a disk drive command, it being understood that other queued commands implementable by the disk control processor 56 may be subject to processing by processor 106 and neural network 108 in accordance with the present invention. The processor 106, in cooperation with the head disk controller 102, implements the queued disk drive command having the shortest expected access time.

In one embodiment, processor 106 and neural network 108 cooperate to sort the commands buffered in the command queue, such that the anticipated time between command completions is minimized. The command sorting operation results in a reordering of the queued commands, such that the next command to be transferred from the command queue for execution represents the command whose access time is the shortest relative to other commands in the queue.

In addition to interacting with neural network 108, and in accordance with one embodiment of the present invention, processor 106 may also interact with a data table 114 which stores information concerning seek times, seek distances, and latency times. More particularly, data table 114 contains seek distances for which the seek time is known with a high degree of certainty for a given latency. For example, data table 114 may contain seek distances for which the seek time is known with near 100% accuracy for a given latency. The data contained in data table 114 is typically obtained empirically and stored in a protected portion of memory 107 or in a reserved portion of a data disk surface.

In operation, and for a given disk drive command, processor 106 may query data table 114 to determine if the seek time associated with the command's latency and seek distance is stored therein. If this seek time data is available in data table 114, this data is used by the processor 106 to compute the expected access time of the command without cooperative processing by neural network 108. If, however, the seek time data for the given command is not stored in the data table 114, neural network 108 is employed to calculate the expected access time of the command.

Data table 114 is typically used for purposes of increasing the rate at which expected access time computations are performed by disk control processor 56. Those skilled in the art will readily appreciate that a large number of calculations are required to scale the inputs of neural network 108 and propagate the values through the network 108. The use of data table 114 typically reduces the processing overhead required to perform expected access time calculations, thereby increasing overall processing efficiency of disk control processor 56. In some applications, data table 114 may not be required or desired.

In an embodiment in which neural network 108 is implemented in hardware, such as in integrated circuit form (e.g., silicon), data table 114 may be unnecessary, owing to the increased processing speed realized when implementing neural network 114 in hardware. Neural network 108 may be embodied in hardware using known digital implementation techniques, such as those discussed in C. Alippi and M. Nigri, "Hardware Requirements for Digital VLSI Implementation of Neural Networks," IEEE International Joint Conference on Neural Networks, vol. 3, pp.1873–1878, 1991 and M. Yasunaga et al., "Design, Fabrication and Evaluation of a 5-inch Wafer Scale Neural Network LSI Composed of 576 Digital Neurons," IEEE International Joint Conference on Neural Networks, vol. II, pp. 527–535, 1990.

Figure 4:
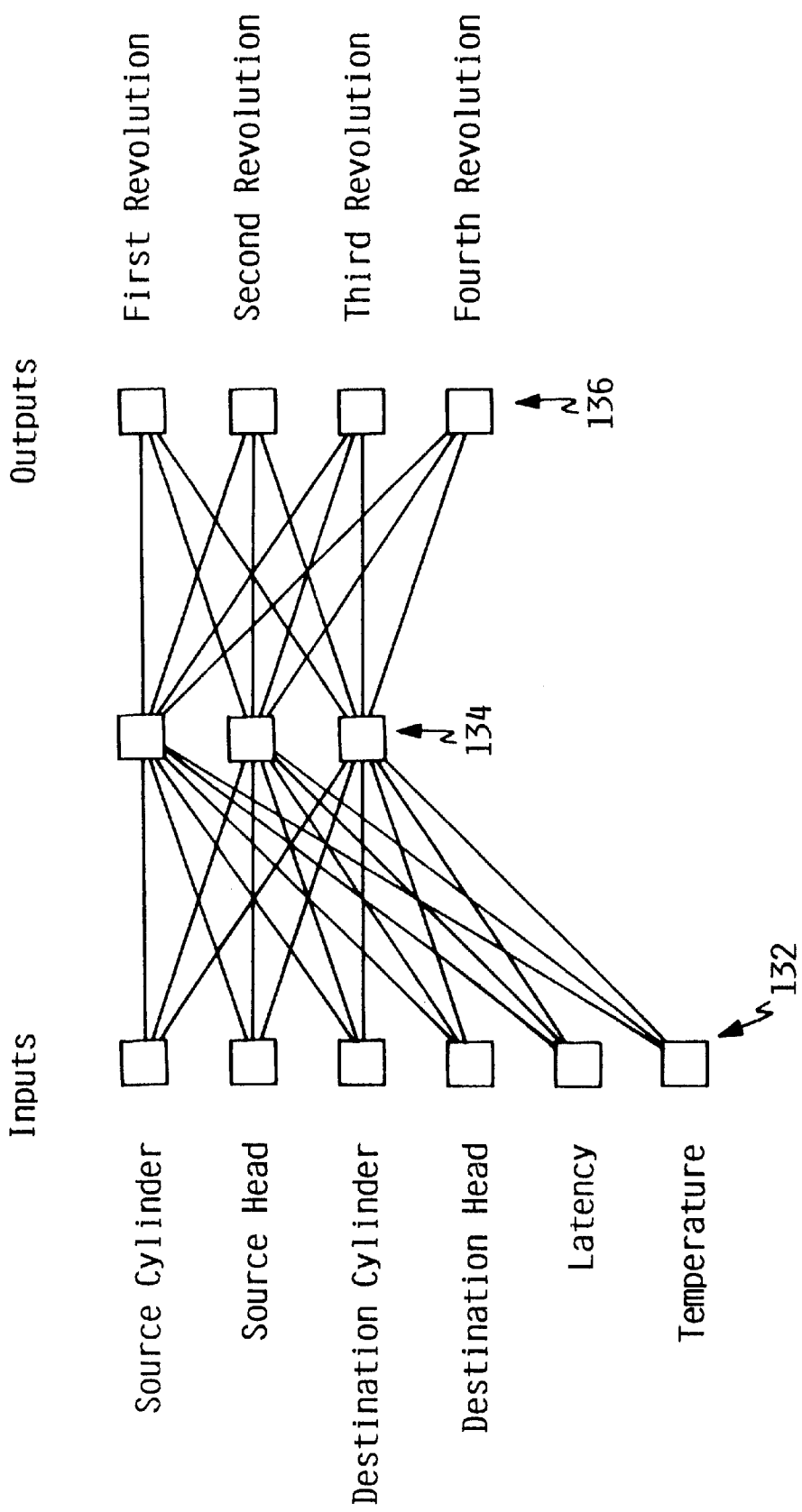
FIG. 4 is a depiction of a neural network employed in a disk drive system for calculating the expected access time of each of a number of queued disk drive commands according to an embodiment of the present invention.

FIG. 4 is a depiction of a neural network architecture well suited for use in neural network 108 shown in FIG. 3. The neural network depicted in FIG. 4 is a 3 layer, 6 input, 4 neuron output feed-forward neural network. Those skilled in the art will readily understand the operation of the neural network depicted in FIG. 4, making an exhaustive description of same unnecessary. Those skilled in the art will further appreciate that neural network architectures other than those illustrated and described herein may also be employed, and that the invention is not limited to a feed-forward architecture of the type specifically described herein.

The neural network depicted in FIG. 4 has an architecture that includes three layers, namely, an input layer 132, a hidden layer 134 and an output layer 136. The input layer 132 includes six inputs. In general, it is desirable to minimize the number of input variables to those that are considered absolutely necessary. As the number of inputs increases, the complexity of the neural network grows exponentially. Although non-linear scaling of the inputs may be employed, the number of inputs should be limited to those considered essential. Other important inputs, however, may be added, assuming that the associated decrease in overall network performance is acceptable.

The inputs of input layer 132 include a source cylinder input, source head input, destination cylinder input, a destination head input, a command latency input, and a temperature input. The source cylinder and source head inputs represent inputs associated with the current cylinder and head from which a seek and settle operation occurs for a given command. The destination cylinder and head represent inputs associated with the target cylinder and head for the given command. Latency (i.e., rotational latency) represents the duration of time required for the command sector to rotate into proximity with the head after completion of a seek and settle operation.

It is noted that the temperature input may represent an "optional" input which, although very useful, may be sacrificed if performance requirements cannot be met. The temperature variable, which is obtained using a temperature sensor provided within the disk enclosure, is a known factor that affects disk drive performance. Disk enclosure temperature, however, is not a variable that is required to perform the expected access time computations according to the embodiment of FIG. 4. Another input that may be considered "optional" within the context of the embodiment of FIG. 4 is seek direction (i.e., toward the ID or OD of the disk).

The neural network shown in FIG. 4 is depicted as including one hidden layer 134. It is understood that two or more hidden layers may be defined as needed or desired. For example, two hidden layers are, in general, sufficient to describe any continuous, differentiable function. The number of nodes in the hidden layer 134 is usually determined experimentally, although the number of nodes is typically, but not necessarily, a number falling between the number of inputs of the input layer 132 and the number of outputs of the output layer 136.

A sigmoidal function is preferably the transfer function of choice. The transfer function is preferably represented by a lookup table supported in the memory accessed by the disk control processor. The weights and biases are preferably stored in a protected location of memory, such as in reserved area sectors on a surface of a data storage disk. The weights and biases are preferably read into the memory accessed by the disk control processor each time the disk drive is spun up. The weights are preferably stored to the disk or other memory periodically during operation.

The output layer 136 includes four outputs, namely, a first revolution output, a second revolution output, a third revolution output, and a fourth revolution output. The outputs correspond to the classification of whether the current command's expected access time will be equal to the current latency (i.e., first revolution output), the current latency plus one revolution (i.e., second revolution output), the current latency plus two revolutions (i.e., third revolution output) or the current latency plus three revolutions (i.e., fourth revolution output). If the maximum seek plus settle time is greater than four revolutions, an additional output may be added. Likewise, if the maximum seek and settle time is less than three revolutions, for example, the number of outputs may be reduced by one.

The outputs of output layer 136 are preferably real-valued outputs which are encoded using a "thermometer" scheme, such that higher values cause activations in more outputs as compared to lower values. Categorical outputs are usually mapped one-for-one. By way of example, it is assumed that two outputs are used in output layer 136. Output values [00] would represent making the command in the first revolution. Output values of [10] would represent making the command in the second revolution, while output values of [11] would represent making the command in the third revolution. By way of further example, and assuming that three outputs are used, output values of [100] would represent making the command in the first revolution, output values of [010] would represent making the command in the second revolution, and output values of [001] would represent making the command in the third revolution.

Figure 5:
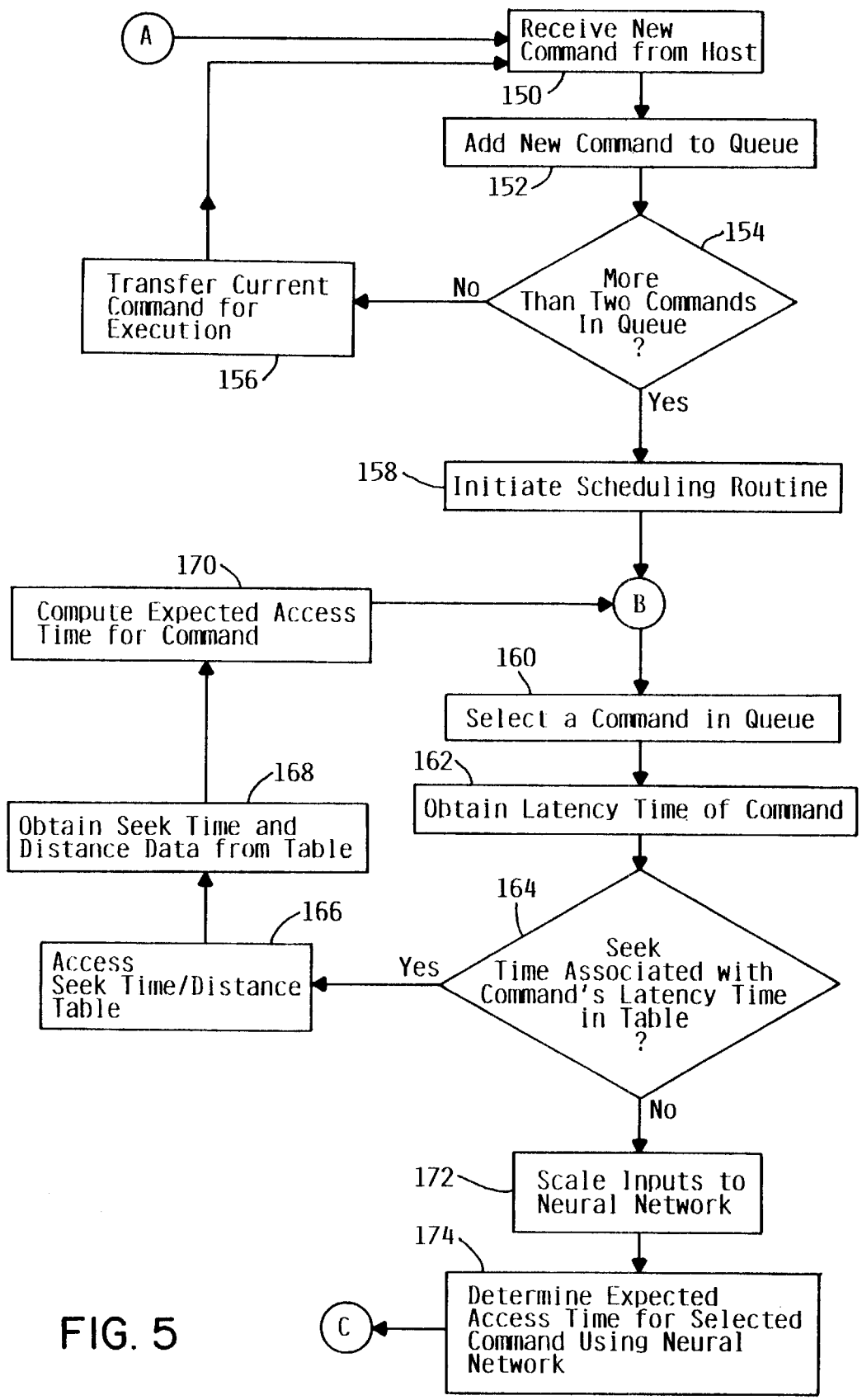
FIGS. 5 and 6 are flow diagrams illustrating several steps associated with calculating the expected access time of each of a number of queued disk drive commands using a neural network according to an embodiment of the present invention.
Figure 6:
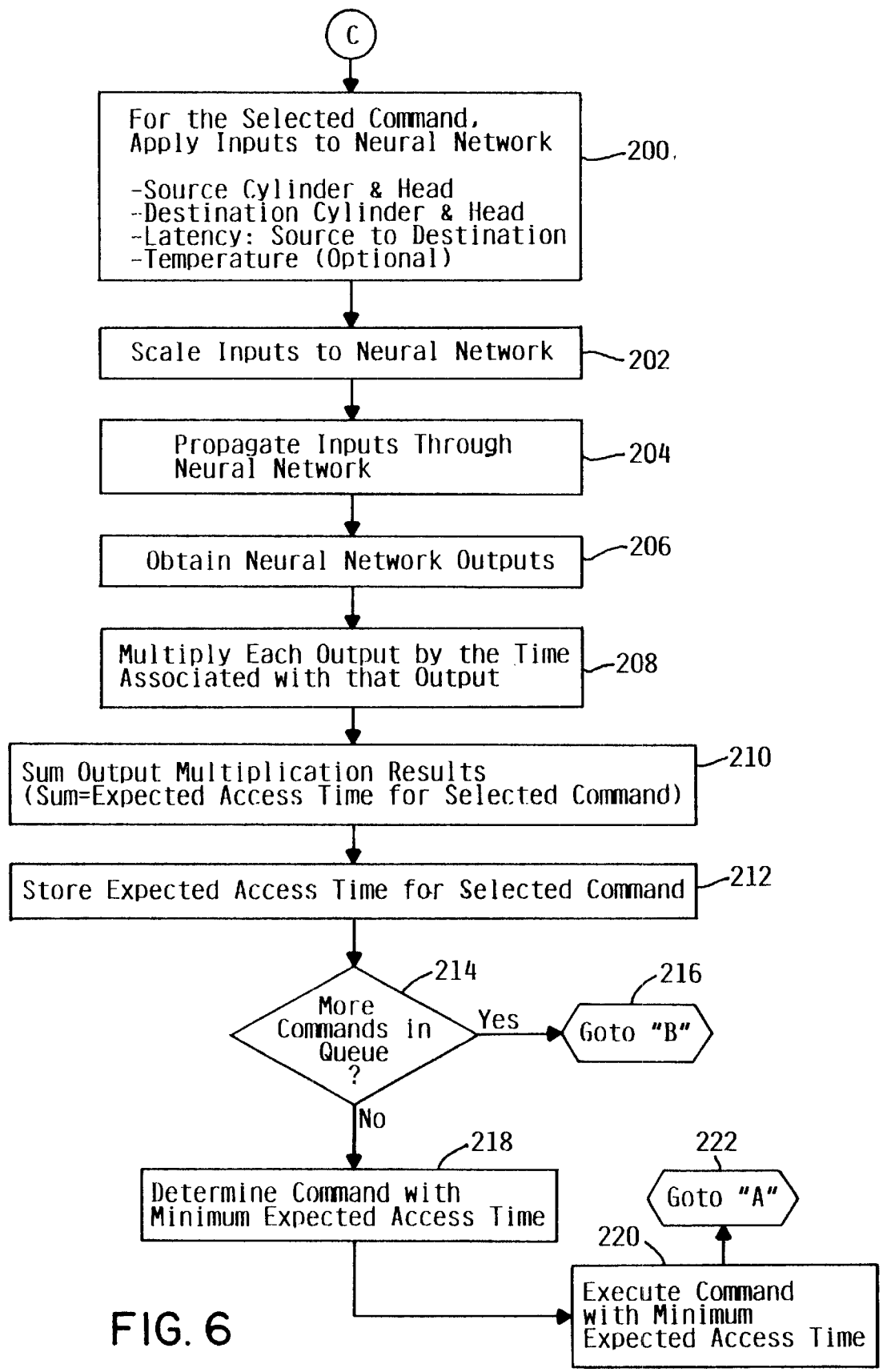

FIGS. 5 and 6 are flow diagrams illustrating several steps associated with calculating the expected access time of each of a number of queued disk drive commands using a neural network according to an embodiment of the present invention. As is shown in FIG. 5, a disk drive command (e.g., write command or read command) is received 150 from a host, such as a remotely or locally situated computer or processor. The newly received command is added 152 to the command queue. If no other command is present 154 in the command queue, the newly received command is transferred 156 from the command queue for execution. If, however, one or more commands are present 154 in the command queue when the newly received command is added 152 to the command queue, a scheduling routine is initiated 158.

The scheduling routine implements an expected access time calculation methodology of the present invention in order to determine which of the queued commands has the shortest access time and, therefore, which of the queued commands is to be given priority. The scheduling routine selects 160 one of the presently queued commands and obtains 162 the rotational latency time associated with the selected command.

Although the commands stored in the command queue may be arranged in several ways, it is desirable that the queued commands be sorted in terms of rotational latency rather than by Logical Block Address to minimize the number of calculations to be performed. In this way, commands are examined in order of increasing rotational latency. If, for example, a command in the command queue is identified that can be executed with 100% certainty, no further commands would need to be examined, since all other commands are guaranteed to take longer than the command just examined. In one embodiment, as was discussed previously, a data table containing latency, seek time, and seek distance information may be accessed 166 during execution of the scheduling routine.

If the seek time associated with the selected command's latency time is stored 164 in the data table, this data is obtained 168 from the data table and used to compute 170 the expected access time for the command Another one of the queued commands is selected 160 for purposes of calculating the expected access time for this newly selected command. It is understood that the process steps of FIG. 5 that involve interaction with the data table may not be required or desired in certain applications. For example, these steps are likely not needed in a configuration in which the neural network is implemented in hardware.

Concerning obtaining 168 data from the data table, rotational latency is preferably used to index into the table or tables. In one embodiment, the data table preferably includes two entries. A first entry of the data table includes seek length, such that for any seek operation of this length or less, it is essentially guaranteed that the associated seek and settle operations will be performed within the first disk revolution time duration (i.e., time period of one disk revolution). In this case, the expected access time would be equal to the command's rotational latency. The second entry of the data table includes seek length, such that for any seek operation of this length or greater, it is essentially guaranteed that the associated seek and settle operations will require more than one disk revolution time duration to be performed.

In this latter case, the expected access time would be equal to the command's rotational latency plus at least one additional disk revolution time duration. If the candidate seek length falls between these two numbers, the outcome is uncertain and the neural network is used to calculate the expected access time for the command in a manner described herein. Current experiments indicate that approximately 25–30% of all seeks fall into this regime of uncertainty, but this percentage may vary widely depending on the characteristics of the particular disk drive employed. Multiple lookups into the data table may be desired or required, but typically only in the case when the data table indicates a 100% chance of a miss. In this case, one disk revolution time duration is added to the command's latency and the data table is queried again.

If the seek time associated with the selected command's latency time is not stored 164 in the data table, the inputs to the neural network are scaled 172. Although scaling of the inputs is not necessarily required, the inputs may be scaled to balance the importance of each input relative to other inputs. Input scaling also helps to constrain the weights inside the neural network and helps to decrease neural network training time. All inputs to the neural network are preferably scaled over the interval [0, 1]. After the inputs to the neural network are scaled 172, the expected access time for the selected command is calculated 174 using the neural network.

Concerning scaling 172 of the neural network inputs, the inputs may be scaled over the interval [0, 1] by, for example, knowing the minimum and maximum values one expects to see from the input variables. These minimum and maximum values are then used to scale the inputs by subtracting the minimum value from the input and dividing this result by the maximum value. Additionally or alternatively, non-linear scaling of the neural network inputs may be used. For certain inputs, as indicated immediately below, scaling factors, SF, may be calculated with exactness, such as:

Cylinder: SF=((input−0)/number of cylinders)
Head: SF=((input−0)/number of heads)
Latency: SF=((input−0)/number of sector ID's (sids)×4 (revs))
Temperature: SF=((input−min. specified temp)/max. specified temp)

Referring now to FIG. 6, the scaled inputs associated with the selected command are applied 200 to the neural network. According to this illustrative embodiment, the inputs to the neural network are the source cylinder and head, the destination cylinder and head, and the rotational latency associated with the selected command. The temperature within the disk drive enclosure may optionally constitute an input to the neural network. As was discussed previously, the inputs to the neural network are scaled 202 by pre-established scaling factors. The inputs are then propagated 204 through the neural network and output values are obtained 206 at the outputs of the neural network.

According to one embodiment, as was previously discussed, the output layer of the neural network may include four outputs, namely, a first revolution output, a second revolution output, a third revolution output, and a fourth revolution output. Because the neural network attempts to minimize the square error of the output over all of the training samples, the output of the neural network represent the estimate of the portion of the attempts that will fall into each of the output categories. As such, each output is multiplied 208 by the time associated with that output. The output multiplication results are then summed 210. The sum of the output multiplication results represents the expected access time associated with the selected command. The expected access time result for the selected command is then stored 212.

If more commands are present in the command queue 218, the scheduling routine selects 160 another command for processing. The expected access time for each of the queued commands is calculated in the above-described manner. The command having the minimum expected access time is determined 218 and transferred for execution 220. The above-described procedure is repeated upon receipt 150 of new disk drive commands.

Figure 7:
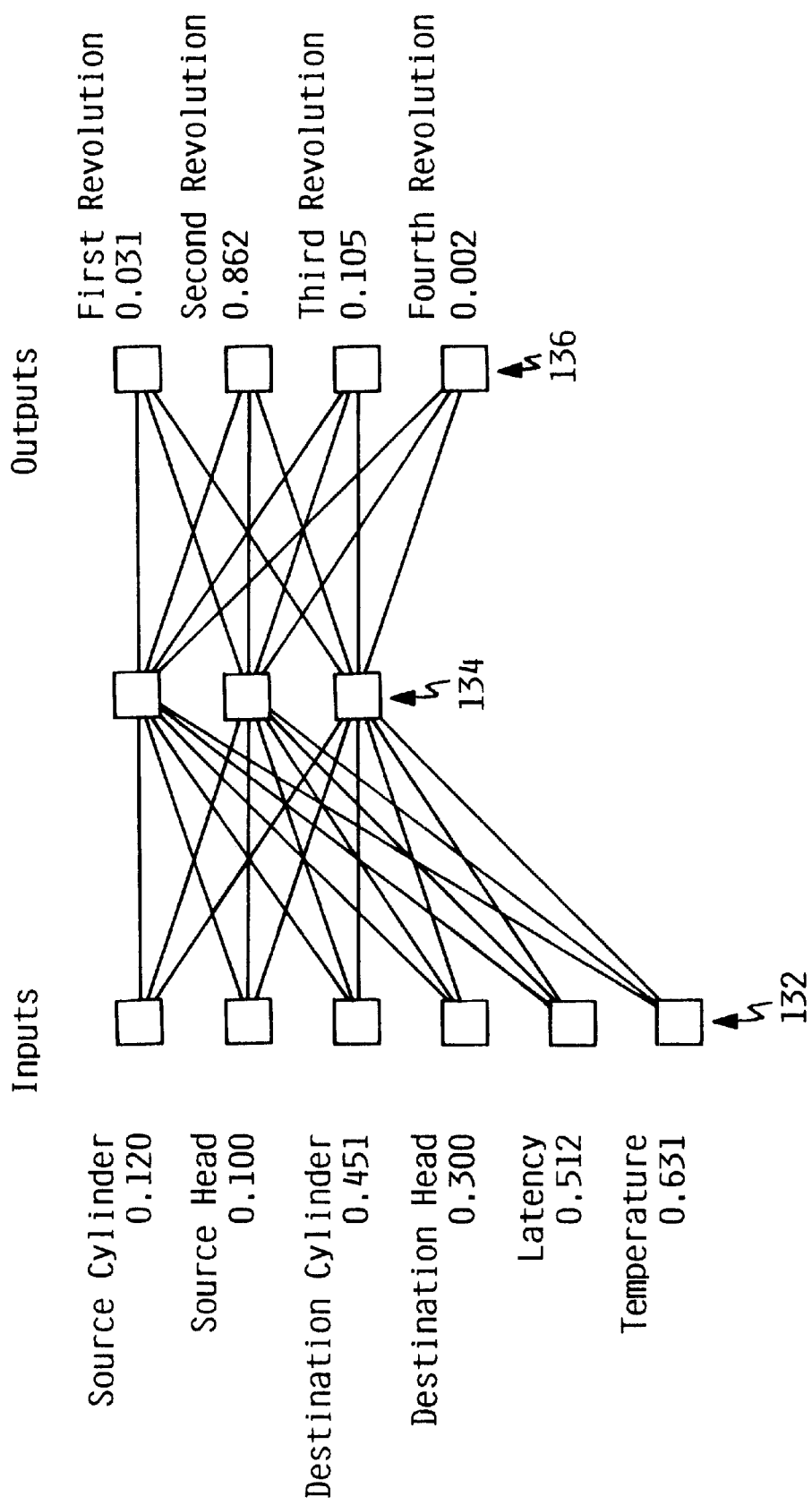
FIG. 7 is a depiction of the neural network illustrated in FIG. 4 with input and output parameters specified for a particular disk drive command in accordance with an embodiment of the present invention.

FIG. 7 is a depiction of the neural network illustrated in FIG. 4 with input and output values specified for a particular disk drive command in accordance with one illustrative embodiment of the present invention. According to this illustrative embodiment, it is assumed that the data storage disks of the disk drive rotate at 10,000 RPM. It is further assumed that the rotational latency for the command being subjected to analysis is 0.512 of a revolution.

The inputs 132 to the neural network are scaled as indicated in FIG. 7. More specifically, the source cylinder input is scaled by a scaling factor of 0.120 and the source head input is scaled by a scaling factor of 0.100. The destination cylinder input is scaled by a scaling factor of 0.451 and the destination cylinder input is scaled by a scaling actor of 0.300. The rotational latency input is scaled by a scaling factor or 0.512 and the optional temperature input is scaled by a scaling factor of 0.631. The values for the four outputs 136 of the neural network shown in FIG. 7 are 0.031, 0.862, 0.105, and 0.002, respectively.

Given the above assumptions, the time for one disk revolution is 6 milliseconds (ms) and the latency for the subject command is 3.072 ms (i.e., 6 ms×0.512=3.072 ms). The time required for each of the neural network outputs 136 is given as:

| | |
|---|---|
| First Revolution: | 3.072 ms (latency + 0 extra revolutions) |
| Second Revolution: | 9.072 ms (latency + 1 extra revolution) |
| Third Revolution: | 15.072 ms (latency + 2 extra revolutions) |
| Fourth Revolution: | 21.072 ms (latency + 3 extra revolutions) |

The expected access time contribution in each output category is given as:

| | |
|---|---|
| First Revolution: | 3.072 × 0.031 = 0.095 ms |
| Second Revolution: | 9.072 × 0.862 = 7.820 ms |
| Third Revolution: | 15.072 × 0.105 = 1.582 ms |
| Fourth Revolution: | 21.072 × 0.002 = 0.042 ms |
| Total: | = 9.539 ms |

The expected access time for this command is thus 9.539 ms. This time value will be compared with the expected access time values of all other commands in the command queue. The command with the shortest expected access time value is selected for execution.

Figure 8:
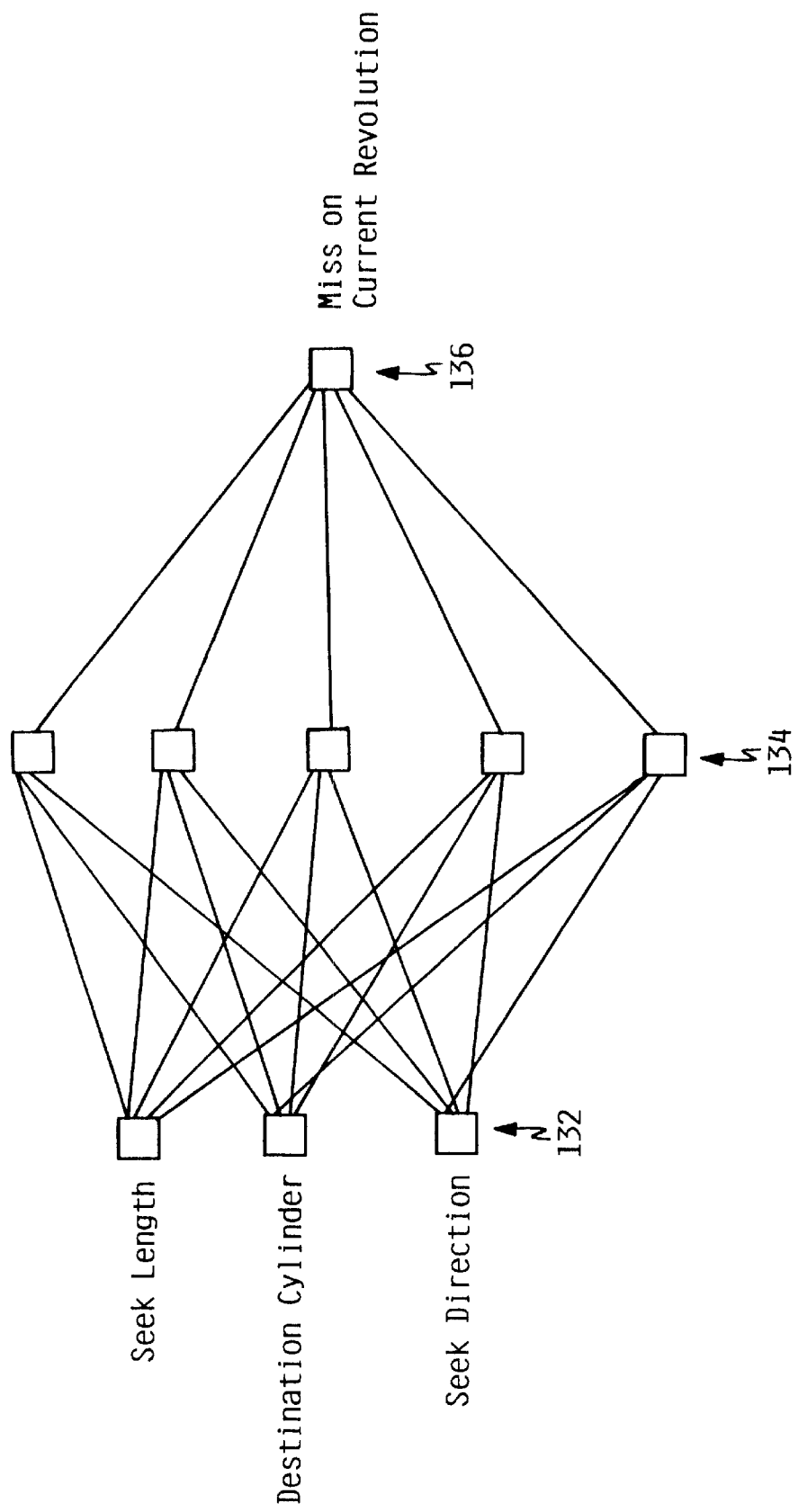
FIG. 8 is a depiction of a neural network with multiple inputs and a single output in accordance with another embodiment of the present invention.

FIG. 8 is an illustration of a neural network of reduced complexity relative to that shown in FIG. 7. According to the embodiment of FIG. 8, the neural network input layer 132 includes three inputs, namely, seek length, destination cylinder, and seek direction. The output layer 136 of the neural network includes a single output. This output represents the probability of a miss on the current revolution of the disk.

In other words, the output of the neural network depicted in FIG. 8 represents a probability of the current command's latency falling within a latency time associated with a current disk revolution. In response to the current command's latency falling beyond the latency time associated with the current disk revolution, an additional disk revolution time duration is added to the current command's latency to produce an adjusted latency, and the neural network determines the expected access time of the current command using the current command's adjusted latency.

Reducing the number of outputs of the neural network typically requires multiple passes through the network in some cases, but greatly reduces the network's complexity. Each successive pass adds one revolution to the candidate's latency.

Separate networks, according to a further embodiment, are provided for each head and command type (e.g., read command, write command, etc.). It will be appreciated that other neural networks of varying inputs, outputs, and complexity may be used for purposes of calculating a disk drive command's expected access time, and that the networks described herein are provided for illustrative purposes only, and are not intended to limit the scope of the present invention.

Training of the neural network may be accomplished using several different approaches. In general, neural network adaptation typically takes place in accordance with a training regime in which the network is subjected to particular information environments on a particular schedule to achieve a desired end result. Each training approach has an associated level of risk. The higher the level of risk, the more safeguards must be put in place and the more evidence of stability must be established.

A low risk training approach involves training a single disk drive off-line, and using the static network developed from off-line training of the single drive on all similarly configured drives. Another low risk training approach involves training each disk drive in-house during manufacturing, then disabling the learning capability of the drive. A medium risk training approach involves allowing each disk drive to train itself for a predetermined period of time or until another learning termination criteria is reached.

A medium-high risk training approach involves allowing each disk drive to train itself as specified above, and subsequently enabling training when performance of the disk drive degrades to some pre-established level. A high risk training approach involves allowing each disk drive to train continuously over its entire operational lifetime. It will be understood that training approaches other than those discussed herein may be employed.

Training may be conducted on an iterative basis or a batch basis. Using an iterative approach, the network weights are updated after each forward pass through the network. An iterative training approach may be used in the field during normal disk drive operation. Using a batch approach, network weights are updated only after all training samples have made a forward pass through the network. A batch approach may be used during manufacturing. Ideally, both iterative and batch training approaches may be used.

The training duration may be based on the number of epochs associated with the training procedure. An epoch refers to one pass through all of the training examples. The training model is preferably based on a Mean Square Error (MSE) methodology or, alternatively, a validation set approach may be used. Training is preferably based on the derivative of the change in weights, such that the change in weights becomes very small. This approach allows the neural network to train indefinitely, although overtraining may still be a consideration.

A scalar value (e.g., 0–1.0) is preferably used to determine the magnitude of the update to the weights during the training phase. High scalar values result in a less stable network. Low scalar values result in slow training rates.

In one embodiment, disk drive training is accomplished in two distinct phases, namely, an off-line phase and an on-line phase. The off-line training phase occurs during the manufacturing process. The disk drive is given a set of random disk drive commands which will be used to train the neural network.

In a preferred embodiment, the disk drive includes at least two neural networks, namely, a first neural network for evaluating read commands and a second neural network for evaluating write commands. Distinct read and write networks are preferably used due to differences between the time to execute a read operation as compared to the time to execute a write operation. Multiple networks may be used to constrain the execution time for a forward pass through the network.

In addition to a distinct read and write neural network, each head may have an associated neural network. In a disk drive having 20 read/write heads, for example, the number of neural networks for such a drive peaks at 40 networks (i.e., 2 (read and write elements)×20 heads).

The networks' input information will be logged, as well as access time, which will be the latency plus some multiple of the single revolution time. Once the commands have been completed, the disk drive will train the network(s) using these patterns. Standard backpropagation is preferably used, although known alternative techniques such as QUICK-PROP may be employed if training time is prohibitive. The above-described training process is repeated with random write commands to train the write neural network.

The on-line version occurs at specified intervals during the disk drive's operating life. When a specified time has elapsed, as defined by a parameter stored in the manufacturer's reserved area of the drive, additional measurements are taken. Once a specified number of these measurements have been taken, the disk drive will be trained for a period of time with the new measurements.

It is preferable that the disk drive not be reinitialized before each training session, so that the drive contains the network's weights prior to training. Unlike off-line training, the network will only traverse the training examples once. This prevents the network from becoming corrupted by a set of bad measurements. In this way, the weights of the network can drift as the physical characteristics of the disk drive change over its operational life.

The foregoing description of the various embodiments of the invention has been presented for the purposes of illustration and description. It is not intended to be exhaustive or to limit the invention to the precise form disclosed. Many modifications and variations are possible in light of the above teaching. For example, the present invention may be used in connection with a wide variety of data storage systems and technologies, and is not limited to those associated with magnetic media. Further, a neural network methodology of the present invention may be employed to extend the capabilities of conventional access time methodologies, such as an SAFT methodology. It is intended that the scope of the invention be limited not by this detailed description, but rather by the claims appended hereto.

What is claimed is:

1. A method of calculating an expected access time associated with one of a plurality of disk drive commands, comprising:

queuing the plurality of disk drive commands;

computing, using a neural network, a likelihood that each queued command's expected access time will fall within a latency time period associated with each queued command and within the latency time period plus one or more single disk revolution time periods, respectively, to determine an expected access time associated with each of the queued commands; and selecting, for execution, a command indicated by the neural network as having a minimum expected access time relative to access times associated with other ones of the queued commands.

2. The method of claim 1, wherein determining the expected access time associated with each of the queued commands comprises:

determining a time for performing a seek and settle operation for each of the queued commands; and determining a latency time associated with each of the queued commands.

3. The method of claim 1, wherein using the neural network further comprises inputting data representative of a current read/write head position, a target read/write head position, and a latency time defined by the current and target read/write head positions.

4. The method of claim 3, wherein using the neural network further comprises inputting data representative of a disk drive temperature.

5. The method of claim 1, wherein using the neural network further comprises inputting a plurality of inputs values to the neural network and scaling each of the input values to the neural network.

6. The method of claim 1, wherein using the neural network further comprises outputting a percentage corresponding to a likelihood that each queued command's expected access time will fall within a latency time period associated with each queued command, the latency time plus one disk revolution time period, and the latency time plus a multiple of disk revolution time periods.

7. The method of claim 6, wherein the multiples of disk revolution time periods comprise two, three, and four disk revolution time periods.

8. The method of claim 1, wherein using the neural network further comprises:

inputting data representative of seek length, destination cylinder, and seek direction; and outputting an output value representing a probability of a particular command's latency falling within a latency time associated with a current disk revolution.

9. The method of claim 8, further comprising adding an additional disk revolution time period to the command's latency to compute an adjusted latency in response to the command's latency falling beyond the latency time associated with a current disk revolution, wherein the neural network determines the expected access time associated with the particular command using the adjusted latency.

10. The method of claim 1, wherein using the neural network further comprises accessing a table comprising data associating a given latency time with known seek distances for which seek times are known to a predetermined level of accuracy.

11. The method of claim 1, further comprising training the neural network on a periodic basis.

12. The method of claim 1, wherein using the neural network further comprises:
using a first neural network to determine an expected access time associated with each of a plurality of queued read commands; and using a second neural network to determine an expected access time associated with each of a plurality of queued write commands.

13. A circuit, comprising:
a controller coupled to a memory, the memory storing a plurality of disk drive commands; and
a neural network coupled to the controller the neural network computing a likelihood that each queued command's expected access time will fall within a latency time period associated with each queued command and within the latency time period plus one or more single disk revolution time periods, respectively, to determine an expected access time associated with each of the commands stored in the memory, and the controller selecting, for execution, a command indicated by the neural network as having a minimum expected access time relative to access times associated with other ones of the stored commands.

14. The circuit of claim 13, wherein the neural network determines the expected access time associated with each of the stored commands by determining a time for performing a seek and settle operation for each of the stored commands and a latency time associated with each of the stored commands.

15. The circuit of claim 13, wherein the neural network comprises inputs for receiving data representative of a current transducer position, a target transducer position, and a latency time defined by the current and target transducer positions.

16. The circuit of claim 15, wherein the neural network further comprises an input for receiving data representative of a temperature.

17. The circuit of claim 13, wherein the neural network comprises a plurality of inputs that receive respective input values, and controller scales the input values applied to the respective neural network inputs.

18. The circuit of claim 13, wherein using the neural network further comprises outputs for respectively outputting a percentage corresponding to a likelihood that each queued command's expected access time will fall within a latency time period associated with each queued command, the latency time plus one disk revolution time period, and the latency time plus a multiple of disk revolution time periods.

19. The circuit of claim 13, wherein the memory comprises a data table comprising data associating a given latency time with known seek distances for which seek times are known to a predetermined level of accuracy, the neural network accessing the table when determining the expected access time associated with each of the commands stored in the memory.

20. The circuit of claim 13, wherein the controller implements training of the neural network on a periodic basis.

21. The circuit of claim 13, wherein the circuit comprises a first neural network and a second neural network, the first neural network determining an expected access time associated with each of a plurality of read commands stored in a read command queue of the memory and the second neural network determining an expected access time associated with each of a plurality of write commands stored in a write command queue of the memory.

22. The circuit of claim 13, wherein the circuit comprises a plurality of neural networks, pairs of the plurality of neural networks associated with one of a plurality of read/write transducers.

23. The circuit of claim 13, wherein the neural network comprises an output and inputs for respectively receiving data representative of seek length, destination cylinder, and seek direction, the neural network providing at the output an output value representing a probability of a particular command's latency falling within a latency time associated with a current disk revolution.

24. The circuit of claim 23, wherein an additional disk revolution time period is added to the command's latency to produce an adjusted latency in response to the command's latency falling beyond the latency time associated with a current disk revolution, and the neural network determines the expected access time associated with the particular command using the adjusted latency.

25. The circuit of claim 13, wherein the neural network is implemented in hardware.

26. A disk drive system, comprising:
a data storage disk;
a transducer;
an actuator that provides relative movement between the transducer and the disk;
controller coupled to a memory; the memory storing a plurality of disk drive commands; and
a neural network coupled to the controller, the neural network computing a likelihood that each queued command's expected access time will fall within a latency time period associated with each queued command and within the latency time period plus one or more single disk revolution time periods, respectively, to determine an expected access time associated with each of the commands stored in the memory, and the controller selecting, for execution, a command indicated by the neural network as having a minimum expected access time relative to access times associated with other ones of the stored commands.

27. The system of claim 26, wherein the neural network determines the expected access time associated with each of the stored commands by determining a time for performing a seek and settle operation for each of the stored commands and a latency time associated with each of the stored commands.

28. The system of claim 26, wherein the neural network comprises inputs for receiving data representative of a current transducer position, a target transducer position, and a latency time defined by the current and target transducer positions.

29. The system of claim 26, wherein the controller scales each of the data inputs to the neural network.

30. The system of claim 26, wherein the neural network further comprises an input for receiving data representative of a temperature of the disk drive system.

31. The system of claim 26, wherein using the neural network further comprises outputs for respectively outputting a percentage corresponding to a likelihood that each queued command's expected access time will fall within a latency time period associated with each queued command, the latency time plus one disk revolution time period, and the latency time plus a multiple of disk revolution time periods.

32. The system of claim 31, wherein the multiples of disk revolution time periods comprise two, three, and four disk revolution time periods.

33. The system of claim 26, wherein the memory comprises a data table comprising data associating a given latency time with known seek distances for which seek times are known to a predetermined level of accuracy, the neural network accessing the table when determining the expected access time associated with each of the commands stored in the memory.

34. The system of claim 26, wherein the controller implements training of the neural network on a periodic basis.

35. The system of claim 26, wherein the system comprises a first neural network and a second neural network, the first neural network determining an expected access time associated with each of a plurality of read commands stored in a read command queue of the memory and the second neural network determining an expected access time associated with each of a plurality of write commands stored in a write command queue of the memory.

36. The system of claim 26, wherein the system comprises a plurality of neural networks, pairs of the plurality of neural networks associated with one of a plurality of read/write transducers.

37. The system of claim 26, wherein the neural network comprises an output and inputs for respectively receiving data representative of seek length, destination cylinder, and seek direction, the neural network providing at the output an output value representing a probability of a particular command's latency falling within a latency time associated with a current disk revolution.

38. The system of claim 37, wherein an additional disk revolution time period is added to the command's latency to produce an adjusted latency in response to the command's latency falling beyond the latency time associated with a current disk revolution, and the neural network determines the expected access time associated with the particular command using the adjusted latency.

39. The system of claim 26, wherein the neural network is implemented in hardware.

* * * * *